July 18, 1967 N. P. ORTHS ETAL 3,332,014
ELECTRIC METER WITH LIGHT RESPONSIVE LIMIT INDICATION
Filed Oct. 28, 1963 2 Sheets-Sheet 1

INVENTORS
NORMAN P. ORTHS &
BY ANDREW MAKOVEC their ATTORNEYS

INVENTORS
NORMAN P. ORTHS &
ANDREW MAKOVEC
their ATTORNEYS

United States Patent Office 3,332,014
Patented July 18, 1967

3,332,014
ELECTRIC METER WITH LIGHT RESPONSIVE LIMIT INDICATION
Norman P. Orths, Fanwood, and Andrew Makovec, Livingston, N.J., assignors to Weston Instruments, Inc., a corporation of Texas
Filed Oct. 28, 1963, Ser. No. 319,226
5 Claims. (Cl. 324—157)

The present invention relates to electrical measurement devices and more particularly to an electrical meter having means for actuating a work circuit when the quantity being measured falls below or exceeds preselected values.

Electrical measuring instruments having this capability have found many important applications in automatic processing control, product inspection systems, warning and alarm systems, and other areas, where it is desired to provide a distinct indication or initiate a function when a predetermined value of an electrical quantity is reached. Various forms of electrical measuring apparatus have been devised for actuating a controlling or indicating work circuit by means of switches associated with the meter movements, but such prior art arrangements suffer from the disadvantages that they require substantial additional weight to be carried by the relatively light moving pointer structure of the electrical instruments, which affects its accuracy of measurment, and also that metal-to-metal switch contacts are used, with the attendant problems of contact wear, arcing, etc.

Accordingly, it is the primary object of the present invention to provide an electrical measuring instrument capable of operating external work circuitry and which avoids the disadvantages of the prior art arrangements.

It is a further object of this invention to provide an improved electrical meter of the character described in which a minimum amount of additional weight is carried by the meter pointer structure whereby its accuracy is unimpaired.

Still another object of the invention is to provide an improved electrical meter construction capable of controlling an external work circuit in which no metal-to-metal contact is required to complete the connections necessary to control the external circuitry.

Briefly in accordance with the present invention, an electrical meter, such as of the moving coil type, is provided with one or more settable index markers which may be adjusted, manually or otherwise, to the values on the meter scale at which it is desired to operate the external work circuit. The end of the index marker below the scale carried a photoelectric cell or other light responsive element. A source of light is provided within the meter housing which is capable of illuminating the photoelectric cell on the index marker over its entire range of movement. The meter pointer itself carries, also below the scale, an opaque vane member which moves in a path which will interpose it between the photoelectric cell on the index marker and the light source when the meter pointer reaches the value to which the index marker is set. The photoelectric cell is connected in a transistorized amplifier circuit which is effective to operate a relay or other switch means to initiate operation of the external circuit.

In the preferred embodiment, the index markers are pivoted about the same axis as the meter pointer and the photoelectric cells thus move in an arcuate path below the meter scale. The light source comprises a planar element of light transmitting material of appreciable thickness having an arcuate light-emitting edge concentric with and spaced from the path described by the photoelectric cells. One or more indented portions or notches are provided in another edge of the light transmitting element, each accommodating a small electric light bulb. All surfaces of the element are coated with an opaque material except the arcuate edge and the indented portions, whereby light emission is confined substantially to the arcuate edge of the element.

The meter pointer carries a thin, arcuately shaped vane member of a lightweight opaque material which moves concentrically in the gap between the path of the photoelectric cells and the light-emitting edge and is of a length with respect to the path and light-emitting edge such that it can block illumination of only one photoelectric cell at a time. The position of the vane with respect to the photoelectric cells is adjusted such that the later is darkened when the meter pointer reaches the limits set by the index marker. A transistorized amplifier circuit is coupled to the photoelectric cell and may be adjusted to operate a relay or other output device either upon illumination of the photo cell or blocking of light therefrom.

The foregoing and other objects, features, and advantages of the present invention will be more readily apparent from the following more detailed description thereof when taken in conjunction with the drawings in which.

Figure 1:
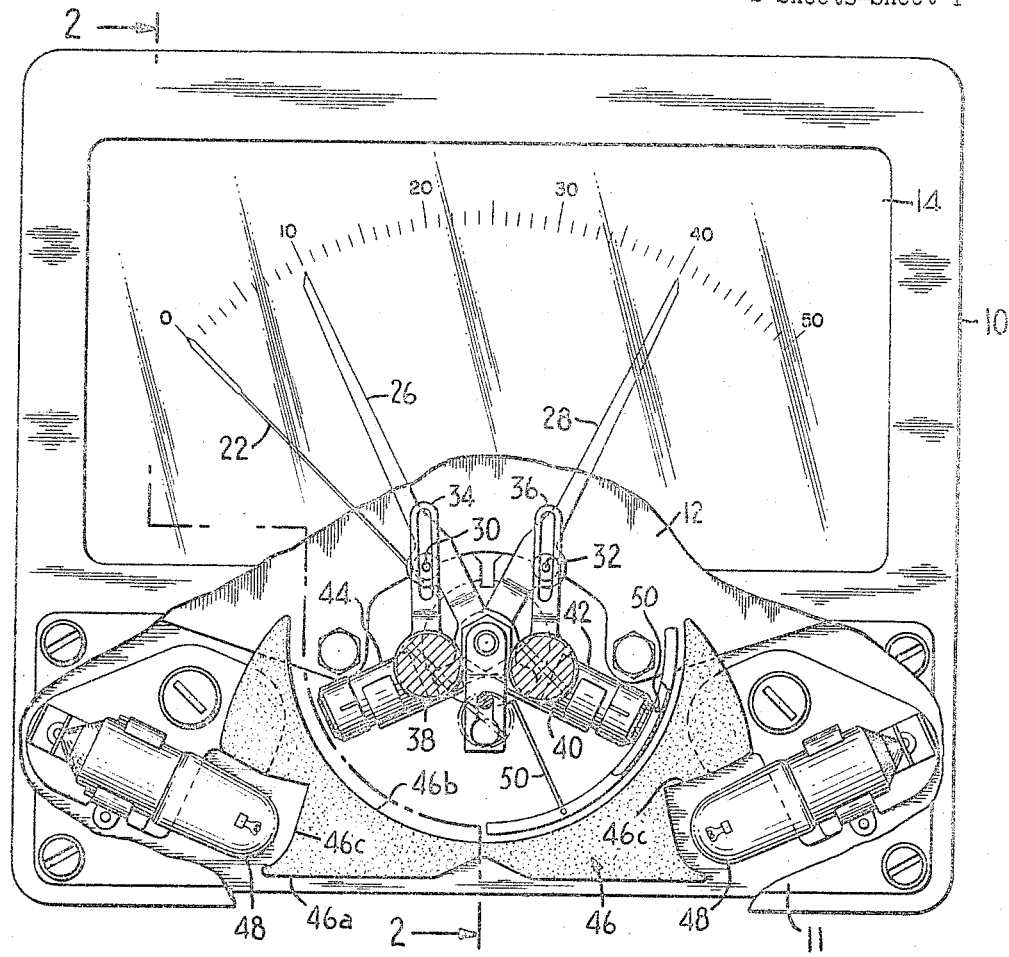
FIGURE 1 is a front view of the meter device according to the invention with a portion of the housing broken away to show the internal structure.
Figure 2:
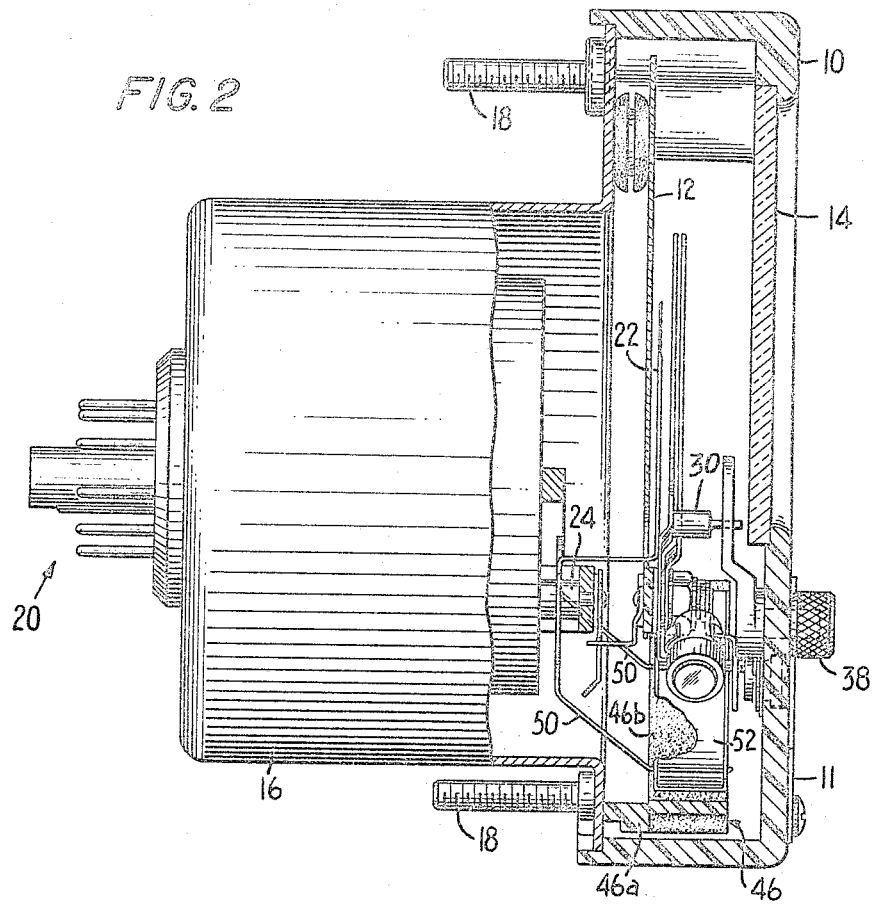
FIGURE 2 is a cross section through the meter structure of FIGURE 1 taken along the lines 2—2.

Turning now to FIGURES 1 and 2, the measuring instrument of the invention is seen to include a front panel housing 10 within which is carried the conventional scale 12 behind a transparent plastic or glass window 14. The meter movement itself, not shown, may be of the conventional moving coil or D'Arsonval type and is housed within the rear casing 16. Screws 18 in the corners of housing structure facilitate mounting in a control panel or console. On the back end of the housing 16 is mounted a multiterminal connector 20 of any suitable type permitting a plug-in connection to the circuitry providing the quantity to be measured and the work circuit to be controlled by the meter. The meter may be used to measure different electrical quantities such as current, voltage, etc., it being understood that in each instance actuation of the meter movement is in response to a current representative of the quantity.

The meter movement carries a meter pointer 22 which is pivoted about a shaft 24 for movement in a plane substantially parallel to the plane of the scale 12. The shaft 24 also supports the moving coil structure of the meter movement in a well known manner. It will be recognized that suitable zero adjustment and balancing means for the meter pointer will be provided although, to simplify the drawing, they are not shown.

A pair of index markers 26, 28 are provided for setting on the meter scale the values at which it is desired to actuate the external circuit. For example, as shown in FIGURE 1, if the scale reads current in microamperes, the meter would actuate the external circuit when the input current being measured drops below 10 microamperes or exceeds 40 microamperes. If desired, of course, only one such index marker may be used.

The index markers 26, 28, are respectively provided with a pair of laterally extending pins 30, 32, engageable respectively by slotted cam members 34, 36. The latter are respectively mounted for rotation about the lower ends thereof by a pair of knurled control knobs 38, 40 projecting from the front of the instrument to enable positioning of the index markers at the values desired.

As seen best in FIGURE 2, the index markers 26 and 28 are rotatable about a shaft coaxial with the shaft about which the meter pointer 22 revolves. Each of the index markers 26, 28, includes an elongated portion visible through the window 14 on one side of the pivot point, and on the other side, a clip for carrying a photoelectric cell 42, 44, respectively. These cells, which may be of the photoconductive type designated as the CL–604–L are in envelopes generally cylindrical in shape, with the active surface at the outer end thereof. As shown in FIGURE 1, the axis of photoelectric cell 42 carried by the index marker 26 is angularly disposed with respect to the visible portion of the marker, as is the axis of photoelectric cell 44 with respect to visible portion of the index marker 28. The photoelectric cells 42, 44 move in substantially the same plane and are separated from each other by an amount dependent upon the preset positions of the index markers. The light sensitive portions of the outer extremities of the photoelectric cells thus are movable along an arcuate path.

Illumination for the photoelectric cells is provided by a generally planar element 46 of light transmitting material of a thickness at least as great as the diameter of the photoelectric cell units. The element 46 includes a laterally extending base portion 46a to permit its mounting in the meter housing, and an arcuate upper edge 46b which is spaced from and concentric with the path described by the photoelectric cells. The right and left hand edges of the element 46 are also provided with indented portions 46c arranged to accommodate electric light bulbs 48. All surfaces of the element 46, which may be of a light transmitting material such as Lucite plastic, are coated with an opaque material except the arcuate edge 46b and the indented portions 46c. Therefore, the two light sources 48 cause illumination of the entire arcuate edge 46b, which has an arcuate length at least as great as between the extremities of the path over which the two photocells 42, 44 may be moved.

The light bulbs 48 are mounted just inside the casing of the instrument in conventional sockets which may be either of threaded or bayonet type. A readily removable front panel 11 is provided therein for enabling easy access for purposes of bulb replacement.

On the other side of its pivot point, the meter pointer 22 supports an opaque vane member 52 on a pair of arms 50 of wire or similar thin material. As seen in FIGURE 2, the vane is of a channel cross section having a width just slightly less than the width of the light-emitting edge 46b. The channel member is arcuately shaped and concentric with the pivot point of the meter pointer 22. Consequently, it is also concentric with the path of motion of the photoelectric cells 42, 44, and the light-emitting surface 46b. The radius of the vane member is selected such that it moves between the path of the photoelectric cells and the arcuate light-emitting surface 46b without touching either. As will be appreciated, deflection of the meter pointer 22 in response to application of a current representing a quantity to be measured, will cause a corresponding deflection of the arcuate vane member 52. The vane member may be made of an opaque, lightweight material such as aluminum or plastic.

In the relative positions shown in FIGURE 1, it will be seen that the meter pointer 22 indicates a measured quantity less than the lower limit set by the index marker 26. The vane member 52 is interposed between the photoelectric cell 42 associated with the marker 26 and the adjacent portion of the light-emitting edge 46, thereby maintaining the photoelectric cell 42 in its darkened or high resistance condition. As the meter pointer 22 moves in a clockwise direction and passes the index marker 26, the vane 52 will be removed from its light blocking position between the light surface and the photoelectric cell 42 and the latter will be exposed to illumination from the edge 46b, putting it in its low resistance state. While the pointer 22 moves between the markers 26 and 28, both of the photoelectric cells 42, 44 are exposed to illumination from the light-emitting surface 46b and consequently both will be in the low resistance state. Finally, when the pointer 22 reaches the index marker 28, indicating the upper limit of the predetermined range of values, the vane 52 is in a position to prevent light from the surface 46b from reaching the photoelectric cell 44, thereby changing it from a low resistance to a high resistance state. As will be described in detail hereinafter, the changes in resistance of the photoelectric cells are used to actuate the control circuitry of the meter, which in turn operates the external control or alarm device.

To enable proper functioning of the apparatus with the minimum spacing between the index markers 26 and 28, the angular positions of the photoelectric cells 42, 44 relative to each other are such that the maximum angle between them (i.e. when the index markers 26, 28 are in their lowest and highest possible positions respectively) is somewhat more than twice the maximum deviation of the meter pointer. Similarly, the arcuate length of the light-emitting surface 46b is of the same magnitude. The vane 52 on the other hand, is approximately one-half the arcuate length of the path of the photoelectric cell and the light-emitting surface 46b. In the example shown in FIGURE 1, the maximum meter pointer deflection is approximately 95° while the length of the photoelectric cell path and the light-emitting surface 46b is somewhat more than 190°. The vane member 52 is accordingly slightly more than 95°.

Although not shown in the drawings, it will be understood that suitable conductive leads to supply power to the bulbs 48 and to couple the photoelectric cells 42, 44 to the control circuitry will be provided within the meter housing.

Figure 3:
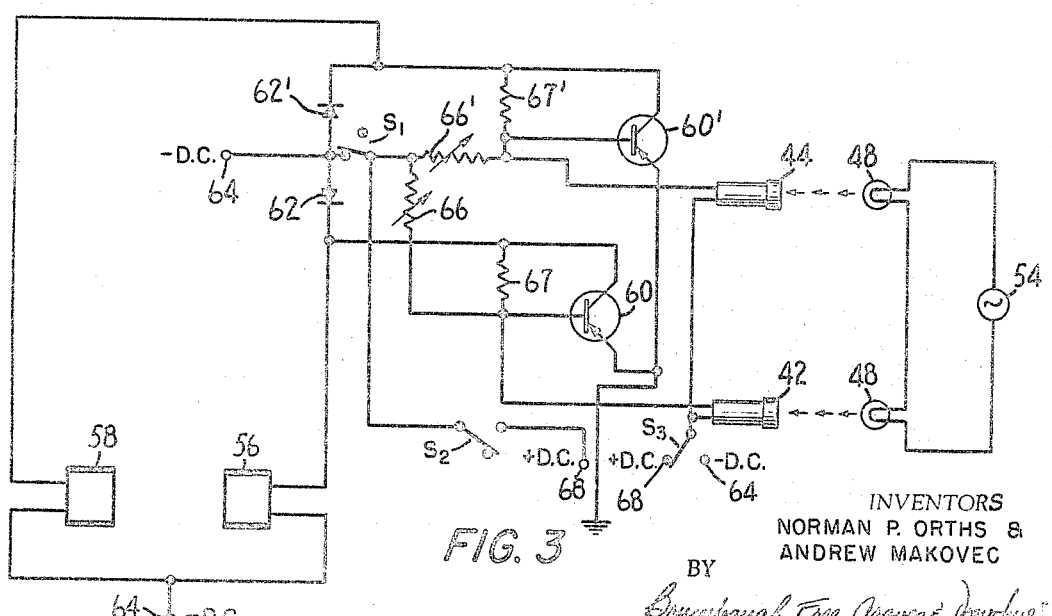
FIGURE 3 illustrates a transistorized photoelectric cell circuit mounted in the meter and forming part of the invention.

A suitable control circuit for operating the external work circuit is shown in FIG. 3. The bulbs 48 are shown in schematic form and are powered by a conventional A.C. source 54 brought in through two of the pins on the multiterminal connector 20 at the rear of the instrument. The other D.C. voltage sources to be described hereinafter will also be brought into the instrument via the connector 20.

Each of the photoelectric cells 42, 44 forms a portion of an individual transistor amplifier circuit which provides an output for operating respective load relays 56, 58. The circuits comprise transistors 60, 60', connected in the common emitter configuration with the emitter grounded. The collectors are coupled through the coils of relays 56, 58, respectively, to a source of negative D.C. potential 64. The diodes 62, 62' prevent interaction of the two separate transistor circuits and feedback resistors 67, 67' serve to stabilize the amplifier operation.

Either of two types of relay operation may be provided with essentially the same basic circuit configuration. Depending upon the nature of the external circuit, it may be desired that the relays be rendered operative only when the photoelectric cells are darkened, or that they be operative during the entire period of illumination of the photoelectric cells. In the circuit shown in FIGURE 3, either of these modes of operation may be effected, depending upon the positions of the switches $S_1$, $S_2$, and $S_3$, and the magnitudes of the adjustable resistors 66, 66'.

With the three switches, which conveniently are mechanically ganged together for simultaneous operation, in the position shown, the relays are unenergized when the photoelectric cells are illuminated or in the low resistance condition. As seen from the drawing, the photoelectric cells together with the associated resistors 66, 66', form voltage dividers between the negative D.C. source 64 and the positive D.C. source 68. The midpoints of the dividers are connected directly to the bases of the transistors 60, 60'. The resistors 66, 66' are each set to a value such that with the associated photoelectric cells in the low resistance condition, a net positive potential appears on the base of the associated transistor, thereby reverse biasing the base-emitter junction and maintaining the transistor nonconductive. When the photoelectric cell is darkened, the transistor base becomes forward biased, saturating the transistor and energizing the associated relay.

With the switches $S_1$, $S_2$, and $S_3$ in their other positions, the polarities of the voltage dividers comprising the photoelectric cells and resistors 66, 66' are reversed. At the same time, the values of the resistors 66, 66' are increased such that, when the photoelectric cells 42, 44 are illuminated, a net negative potential appears on the base of the transistor, forward biasing it and putting it into saturation. In this mode of operation, the relays 56, 58 thus remain energized as long as the corresponding photoelectric cells are illuminated.

Regardless of the mode of operation selected, the circuits return the relays to their initial conditions when the meter pointer returns to its initial position without additional reset circuitry. No metal-to-metal switch contacts appear anywhere in the meter control circuit itself and the relays can control relatively high power circuits without having to switch the high currents within the meter structure itself. Operation of the relays is enhanced by the amplification afforded by the respective transistor circuit, and the stabilization provided by resistors 67, 67' prevents chattering of the relay contacts. All of the circuitry of FIGURE 3 other than the relays 56, 58, may be conveniently mounted on a printed circuit board within the meter housing 16.

It will be understood that where only one index marker is required, a single transistor amplifier circuit only need be employed. In such a case, all of the circuit components having primed reference numerals, for example, along with the one of the bulbs 48 and one of the photoelectric cells may be eliminated. Moreover, where only one mode of operation of the relay is required, the meter may be provided with the desired circuit without the switches $S_1$, $S_2$, and $S_3$.

It will be understood that various modifications of the disclosed meter construction will occur to those skilled in the art, and it is intended that the invention be limited only by the scope of the appended claims.

We claim:

1. In a meter device for measuring an electrical quantity including a pointer rotatable in a given plane about a pivot and electrical current responsive means for deflecting said pointer about its pivot point to an extent dependent upon the magnitude of said electrical quantity, said pointer having a predetermined maximum angular deflection, means for indicating when said quantity reaches a given value comprising, an index marker movable in a plane substantially parallel to said given plane about a pivot point coaxial with the pivot point of said pointer, a photoelectric cell carried by said index marker and movable therewith along a substantially arcuate path, a generally planar element of light transmitting material lying generally in the plane of the arcuate path described by said photoelectric cell, said element having appreciable thickness and presenting a concave arcuate light-emitting edge concentric with and spaced outwardly of said path over its entire length, said light-emitting edge having an arcuate length greater than twice the maximum angular deflection of said pointer, a light source coplanar with said photoelectric cell path and said light-emitting edge, an indented portion in an edge of said element other than said arcuate edge for accommodating said light source, an opaque coating over all surfaces of said element other than said arcuate edge and said indented portion, whereby said element emits light substantially only along said arcuate edge, a single arcuate opaque vane carried by said pointer on the other side of its pivot point for deflection therewith in the gap between said path and said light-emitting edge, said vane having an arcuate length approximately one-half of the length of said path and said light-emitting edge, and electrical circuit means coupled to said photoelectric cell for providing an output representative of the position of said pointer relative to said index marker.

2. The apparatus of claim 1 above wherein said index marker includes an indicating portion on the other side of its pivot point from said photoelectric cell.

3. The apparatus of claim 2 above wherein two independently movable index markers are provided, each carrying its own photoelectric cell along said path.

4. The apparatus of claim 1 above wherein said photoelectric cell provides a resistance value determined by its condition of illumination and wherein said electrical circuit means comprises a work circuit, said work circuit including a transistor amplifier having its output dependent upon the resistance value of said photoelectric cell.

5. The apparatus of claim 2 above wherein two independently movable index markers are provided, each carrying its own photoelectric cell along said path, and said element includes two such indented portions for accommodating two light sources.

References Cited

UNITED STATES PATENTS

| 2,236,255 | 3/1941 | Young | 250—231 |
| 2,505,420 | 4/1950 | McCrary | 250—227 X |
| 2,561,508 | 7/1951 | Gregorie | 250—231 X |
| 3,028,503 | 4/1962 | Stevenson | 250—231 |
| 3,054,928 | 9/1962 | Schrenk | 250—231 X |
| 3,114,089 | 12/1963 | Mulligan. | |
| 3,249,759 | 5/1966 | Sendro | 324—96 X |

FOREIGN PATENTS

| 858,722 | 1/1961 | Great Britain. |

WALTER L. CARLSON, *Primary Examiner.*
RUDOLPH V. ROLINEC, *Examiner.*